United States Patent
Sone

(10) Patent No.: US 12,120,773 B2
(45) Date of Patent: Oct. 15, 2024

(54) NON-TRANSITORY COMPUTER-READABLE RECORDING MEDIUM STORING APPLICATION PROGRAM INCLUDING COMPUTER-READABLE INSTRUCTIONS FOR TERMINAL DEVICE AND METHOD FOR CONTROLLING TERMINAL DEVICE

(71) Applicant: BROTHER KOGYO KABUSHIKI KAISHA, Nagoya (JP)

(72) Inventor: Tatsuhiko Sone, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/480,371

(22) Filed: Sep. 21, 2021

(65) Prior Publication Data

US 2022/0104006 A1 Mar. 31, 2022

(30) Foreign Application Priority Data

Sep. 25, 2020 (JP) ................................ 2020-160728

(51) Int. Cl.
*H04W 8/22* (2009.01)

(52) U.S. Cl.
CPC ..................................... *H04W 8/22* (2013.01)

(58) Field of Classification Search
None
See application file for complete search history.

(56) References Cited

U.S. PATENT DOCUMENTS

2012/0147256 A1* 6/2012 Umeyama .......... H04N 1/00896
  348/372
2017/0126928 A1* 5/2017 Kawai ................ H04N 1/00307

FOREIGN PATENT DOCUMENTS

| JP | H103450 A | * | 1/1998 | ........... G06F 3/1284 |
| JP | 2000056868 A | * | 2/2000 | .......... G06F 11/3055 |
| JP | 2019-169947 A | | 10/2019 | |

\* cited by examiner

*Primary Examiner* — Jinsong Hu
*Assistant Examiner* — Alexander J Yi
(74) *Attorney, Agent, or Firm* — Scully, Scott, Murphy & Presser, PC

(57) ABSTRACT

Computer-readable instructions, when executed by a processor of a terminal device, may cause the terminal device to: repeatedly execute a first-type communication process using first-type communication via Internet, wherein the first-type communication process is for receiving related information which is related to a communication device; and repeatedly execute a second-type communication process using second-type communication not via the Internet, wherein the second-type communication process is for receiving the related information. A first interval for repeatedly executing the first-type communication process may be longer than a second interval for repeatedly executing the second-type communication process.

18 Claims, 8 Drawing Sheets

NON-TRANSITORY COMPUTER-READABLE RECORDING MEDIUM STORING APPLICATION PROGRAM INCLUDING COMPUTER-READABLE INSTRUCTIONS FOR TERMINAL DEVICE AND METHOD FOR CONTROLLING TERMINAL DEVICE

CROSS-REFERENCE TO RELATED APPLICATION

This application claims priority to Japanese Patent Application No. 2020-160728, filed on Sep. 25, 2020, the entire contents of which are incorporated herein by reference.

TECHNICAL FIELD

The technique disclosed herein relates to a terminal device configured to execute both communication via the Internet and communication not via the Internet.

BACKGROUND

Smartphones are known that are capable of connecting to the Internet using mobile communication systems such as 3G, 4G, and the like, and are also capable of connecting to external devices using wireless LAN (Local Area Network) communication systems such as Wi-Fi and the like. In such a smartphone, a communication system connected to the Internet is used preferentially in a situation in which connections according to plural communication systems are established in parallel.

SUMMARY

Typically, communication using a LAN is implemented through a fixed-rate service. With such a service, an upper limit to communication volume does not tend to be set. Communication using the Internet, such as 3G and 4G, is also implemented through a fixed-rate service, however, an upper limit to monthly communication volume is usually set by the carrier that provides the service. Thus, generally, the cost for the communication using the Internet such as 3G and 4G is more expensive than the cost for the communication using a LAN. The disclosure herein provides a technique that makes it possible to reduce communication cost in a terminal device configured to execute both communication via the Internet and communication not via the Internet.

A non-transitory computer-readable recording medium storing an application program including computer-readable instructions for a terminal device is disclosed herein. The computer-readable instructions, when executed by a processor of the terminal device, may cause the terminal device to: repeatedly execute a first-type communication process using first-type communication via Internet, wherein the first-type communication process is for receiving related information which is related to a communication device different from the terminal device, and the first-type communication process includes sending a first information request to a first external device; and repeatedly execute a second-type communication process using second-type communication not via the Internet, wherein the second-type communication process is for receiving the related information and includes sending a second information request to a second external device. A first interval for repeatedly executing the first-type communication process may be longer than a second interval for repeatedly executing the second-type communication process.

A non-transitory computer-readable recording medium storing the above-described application program, a terminal device implemented by the application program, and a method carried out by the terminal device are also novel and useful.

Figure 1:
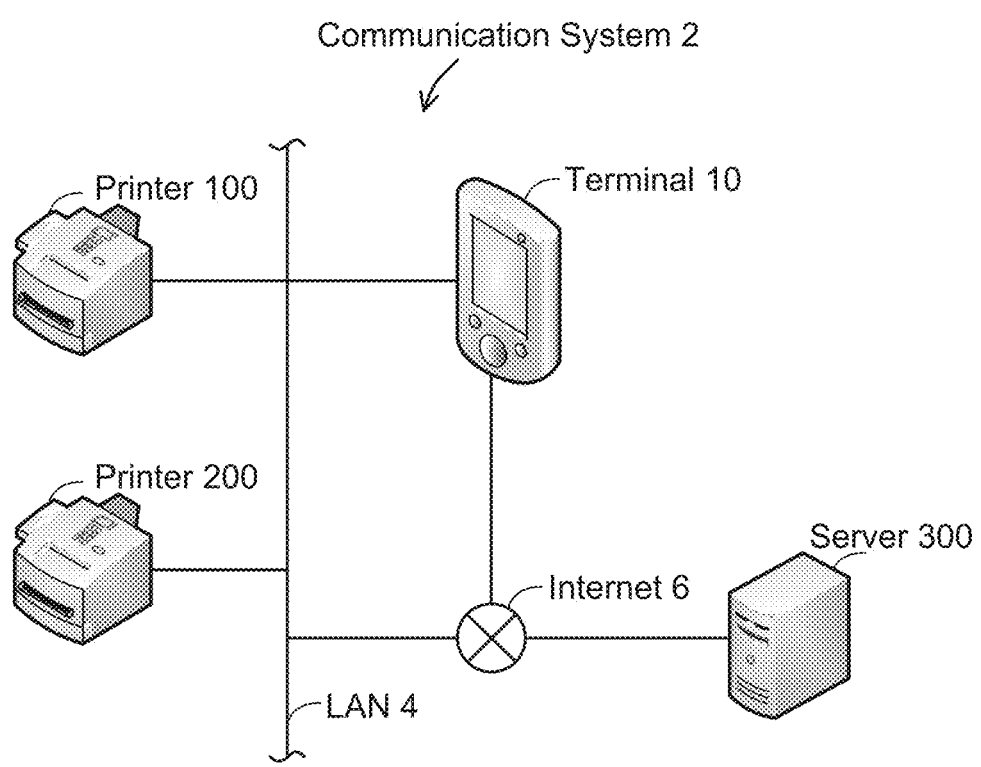
FIG. 1 shows a configuration of a communication system.

DETAILED DESCRIPTION (Configuration of Communication System 2; FIG. 1)

As shown in FIG. 1, a communication system 2 comprises a terminal 10, two printers 100 and 200, and a server 300. The terminal 10 and the two printers 100 and 200 are connected to a LAN (Local Area Network) 4 and are communicable with each other via the LAN 4. The terminal 10 and the server 300 are connected to the Internet 6 and are communicable with each other via the Internet 6. The LAN 4 is a wireless LAN and is connected to the Internet 6. The devices 10, 100, 200, and 300 are communicable with each other via the LAN 4 and the Internet 6.

Figure 2:
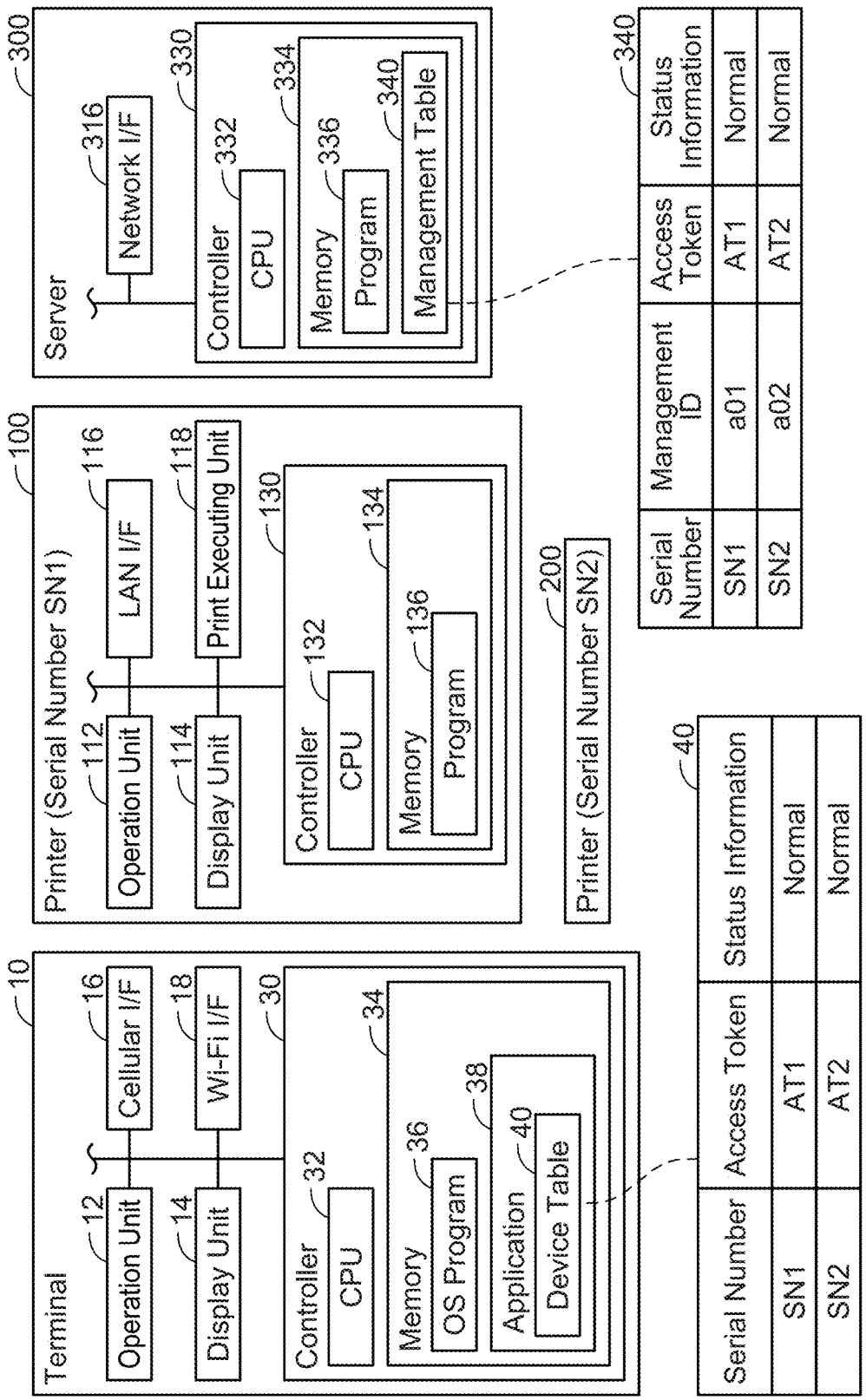
FIG. 2 shows a block diagram for configurations of devices in the communication system.

(Configuration of Terminal 10; FIG. 2)

The terminal 10 is a portable terminal device such as a mobile phone (e.g., smartphone), a PDA, a tablet PC, or the like. In a variant, the terminal 10 may be a stationary PC, a laptop PC, or the like. The terminal 10 comprises an operation unit 12, a display unit 14, a cellular interface 16, a Wi-Fi interface 18, and a controller 30. Hereinbelow, an interface will be abbreviated as "I/F". The units 12 to 30 are connected to a bus line (for which a reference sign is not given).

The operation unit 12 includes a plurality of keys. A user can input various instructions to the terminal 10 by operating the operation unit 12. The display unit 14 is a display configured to display various information. The display unit 14 is a so-called touch screen and also functions as an operation unit.

The cellular I/F 16 is a wireless interface for cellular communication according to a cellular scheme. The cellular scheme is a wireless communication scheme in which an area is divided into predetermined sections (i.e. cells), and base station arranged in each cell is used. The cellular scheme includes 3G, 4G, 5G, and the like specified by the International Telecommunication Union. In other words, the cellular scheme is a mobile communication scheme. The cellular I/F 16 is usually connected to one of the base stations. The cellular I/F 16 is connected to the Internet 6. Thus, typically, the terminal 10 is configured to execute cellular communication with a device on the Internet 6 (e.g., the server 300) via the cellular I/F 16.

The Wi-Fi I/F 18 is a wireless interface for Wi-Fi communication according to a Wi-Fi standard. The Wi-Fi standard is a wireless communication standard for executing wireless communication according to, for example, the 802.11 standard by the IEEE (the Institute of Electrical and Electronics Engineers, Inc.) and standards conforming therewith (e.g., 802.11a, 11b, 11 g, 11n, etc.). The Wi-Fi I/F 18 is connected to the LAN 4. That is, the Wi-Fi I/F 18 is an I/F for Wi-Fi communication via the LAN 4.

Typically, the cellular communication is implemented through fixed-rate services provided by so-called carriers. With such cellular communication services, upper limits tend to be set to communication volume within a certain period (e.g., one month). Once the communication volume exceeds the upper limit, the cellular communication service is limited or additional fees are required to continue the service. The Wi-Fi communication is implemented through fixed-rate services provided by providers. With such Wi-Fi communication services, upper limits do not tend to be set to communication volume within a certain period. Thus, generally, it can be said that the cost for cellular communication is more expensive than the cost for Wi-Fi communication.

The controller 30 comprises a CPU 32 and a memory 34. The CPU 32 is configured to execute various processes in accordance with programs 36 and 38 stored in the memory 34. The memory 34 is configured of a volatile memory, a non-volatile memory, and the like and stores an Operating System (OS) program 36 and an application 38. Hereinbelow, an application will be abbreviated as "app".

The OS program 36 is a program for controlling basic operations of the terminal 10. The app 38 is a program for obtaining information related to a printer (e.g., 100) and displaying the information. The app 38 is installed to the terminal 10, for example, from a server (not shown) on the Internet 6 provided by the vendor of the printer 100.

The app 38 stores a device table 40. In the device table 40, a serial number which is information for identifying a printer, an access token, and status information (e.g., normal, error, etc.) of the printer are stored in association with each other. The access token is authentication information for using the server 300.

(Configuration of Printer 100)

The printer 100 is a peripheral device (e.g., a peripheral device of the terminal 10) configured to execute a print function and has a serial number SN1. The printer 100 may be a multifunctional device configured to execute a scan function, a fax function, and/or the like in addition to the print function. The printer 100 comprises an operation unit 112, a display unit 114, a LAN I/F 116, a print executing unit 118, and a controller 130. The units 112 to 130 are connected to a bus line (for which a reference sign is not given).

The operation unit 112 includes a plurality of keys. The user can input various instructions to the printer 100 by operating the operation unit 112. The display unit 114 is a display configured to display various information. The LAN I/F 116 is connected to the LAN 4 (see FIG. 1). The print executing unit 118 includes a print mechanism of ink-jet scheme, laser scheme, or the like.

The controller 130 includes a CPU 132 and a memory 134. The CPU 132 is configured to execute various processes in accordance with a program 136 stored in the memory 134. The memory 134 is configured of a volatile memory, a non-volatile memory, and the like.

(Configuration of Printer 200)

The printer 200 has the same configuration as that of the printer 100 except that it has a serial number SN2.

(Configuration of Server 300)

The server 300 is a server for managing information (e.g., status information) on the respective printers 100 and 200. The server 300 is installed on the Internet 6 by the vendor of the printers 100 and 200.

The server 300 establishes Extensible Messaging and Presence Protocol (XMPP) sessions with the printers 100 and 200. The XMPP session is referred to as so-called full-time connection. By using the XMPP sessions, the server 300 can send requests to the printers beyond the firewall of the LAN to which the printers belong (e.g., the firewall formed by a router) without receiving requests from the printers. That is, the XMPP sessions are sessions through which server-push communication can be executed.

The server 300 comprises a network I/F 316 and a controller 330. The units 316 and 330 are connected to a bus line (for which a reference sign is not given). The network I/F 316 is connected to the Internet 6 (see FIG. 1). The controller 330 includes a CPU 332 and a memory 334. The CPU 332 is configured to execute various processes in accordance with a program 336 stored in the memory 334. The memory 334 is configured of a volatile memory, a non-volatile memory, and the like. The memory 334 also stores a management table 340 in addition to the program 336.

In the management table 340, a serial number, a management ID for printer management, an access token, and status information of a printer are stored in association with each other.

Figure 3:
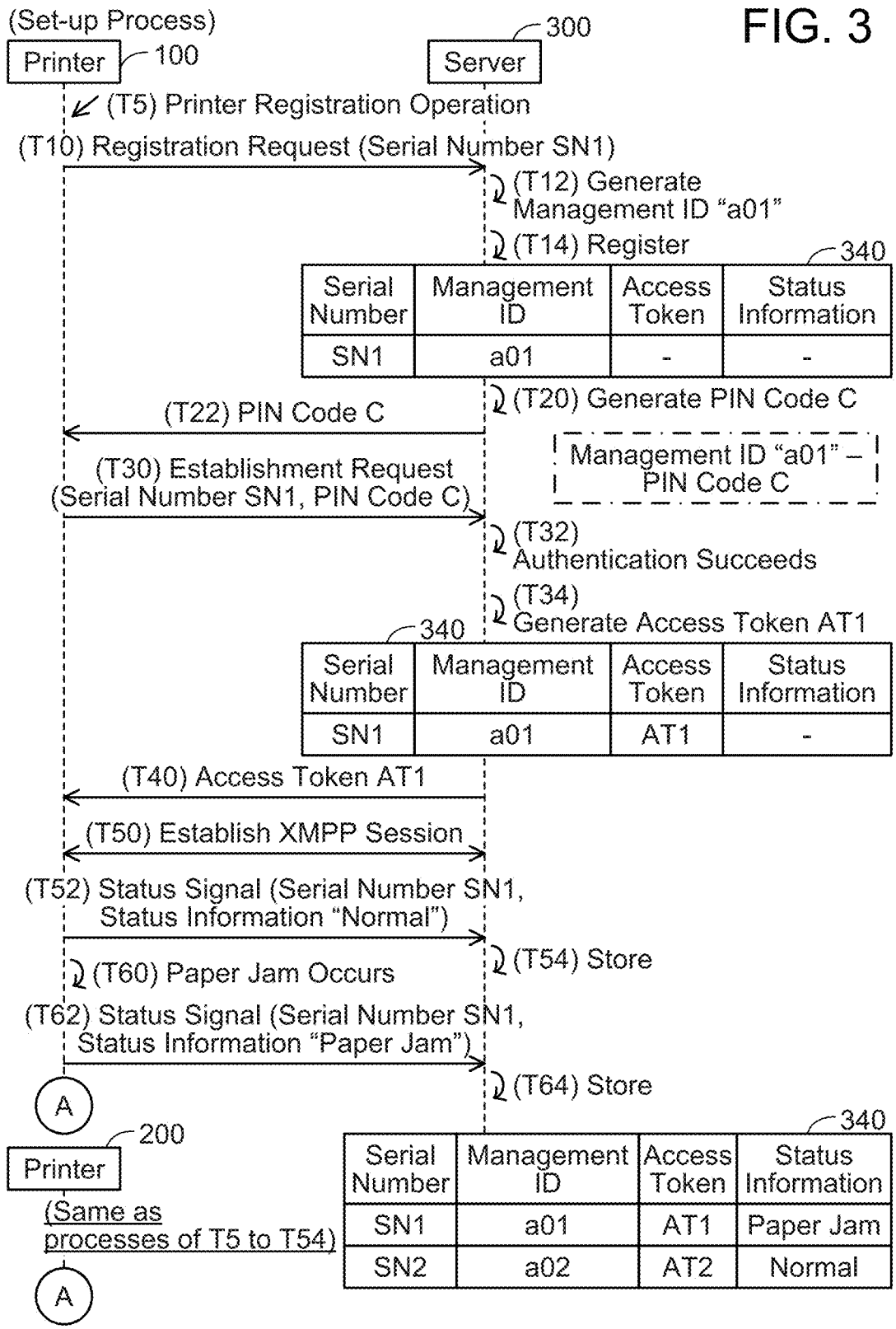
FIG. 3 shows a sequence diagram of a setup process.

(Setup Process; FIG. 3)

Referring to FIG. 3, a setup process for registering the printers 100 and 200 in the server 300 will be described. To facilitate understanding, in the description for FIG. 3, processes that the CPUs of the devices (e.g., the CPU 332 of the server 300, etc.) execute will be described with the devices (e.g., the server 300, etc.) as the subjects of action instead of describing them with the CPUs as the subjects of action. This also applies to FIGS. 4, 7, and 8 to be described later. Further, in the following description, communication is executed via the LAN 4 and the Internet 6 between the printer 100 and the server 300. Thus, phrases "via the LAN 4" and "via the Internet 6" will be omitted hereinbelow, unless otherwise noted.

When the printer 100 accepts a printer registration operation for registering the printer 100 in the server 300 from the user in T5, the printer 100 sends a registration request that requests the registration of the printer 100 to the server 300 in T10. The registration request includes the serial number SN1 of the printer 100.

When receiving the registration request from the printer 100 in T10, the server 300 generates a management ID "a01" in T12. Then, in T14, the server 300 stores the serial number SN1 included in the registration request of T10 and the management ID "a01" generated in T12 in association with each other in the management table 340. At this point, an access token and status information are not stored yet in association with the serial number SN1 in the management table 340.

In T20, the server 300 then generates a PIN code C. The server 300 stores the PIN code C in association with the management ID "a01" in the memory 334. In T22, the server 300 sends the PIN code C to the printer 100.

When receiving the PIN code C from the server 300 in T22, the printer 100 sends an establishment request that requests the establishment of an XMPP session to the server 300 in T30. The establishment request includes the serial number SN1 and the PIN code C.

When receiving the establishment request from the printer 100 in T30, the server 300 authenticates the PIN code C included in the establishment request in T32. In the present case, the PIN code C in the establishment request matches the PIN code C in the memory 334, and thus the authentication of the PIN code C succeeds. Then, the server 300 executes processes from T34 and onward. If the authentication of the PIN code fails, the server 300 does not execute the processes from T34 and onward.

In T34, the server 300 generates an access token AT1. The server 300 specifies the management ID "a01" stored in association with the PIN code C from the memory 334. Then, the server 300 stores the generated access token AT1 in the management table 340 in association with the specified management ID "a01". In T40, the server 300 sends the access token AT1 to the printer 100.

When receiving the access token AT1 from the server 300 in T40, the printer 100 stores the access token AT1. The printer 100 then establishes an XMPP session with the server 300 by using the access token AT1 in T50.

When the XMPP session has been established with the server 300, the printer 100 sends a status signal indicative of the current status of the printer 100 to the server 300 in T52. In the present case, the status signal includes the serial number SN1 of the printer 100 and status information indicating that the current status of the printer is normal.

When receiving the status signal from the printer 100 in T52, the server 300 stores in T54 the status information "normal" included in the status signal in the management table 340 in association with the serial number SN1 included in the status signal.

In T60, a paper jam occurs in the printer 100. In this case, the printer 100 sends a status signal that includes status information indicative of the occurrence of paper jam to the server 300 in T62.

When receiving the status signal from the printer 100 in T62, the server 300 stores in T64 the status information "paper jam" included in the status signal in the management table 340 in association with the serial number SN1 included in the status signal. As above, the printer 100 sends the server 300 a status signal indicative of the current status of the printer 100 each time the status of the printer 100 changes. In a variant, the printer 100 may send a status signal to the server 300 each time a predetermined time arrives.

After that, processes similar to T5 to T54 are executed between the printer 200 and the server 300. As a result, the printer 200 stores an access token AT2. Further, the server 300 stores, in the management table 340, the serial number SN2 of the printer 200, a management ID "a02", the access token AT2, and status information in association with each other.

Figure 4:
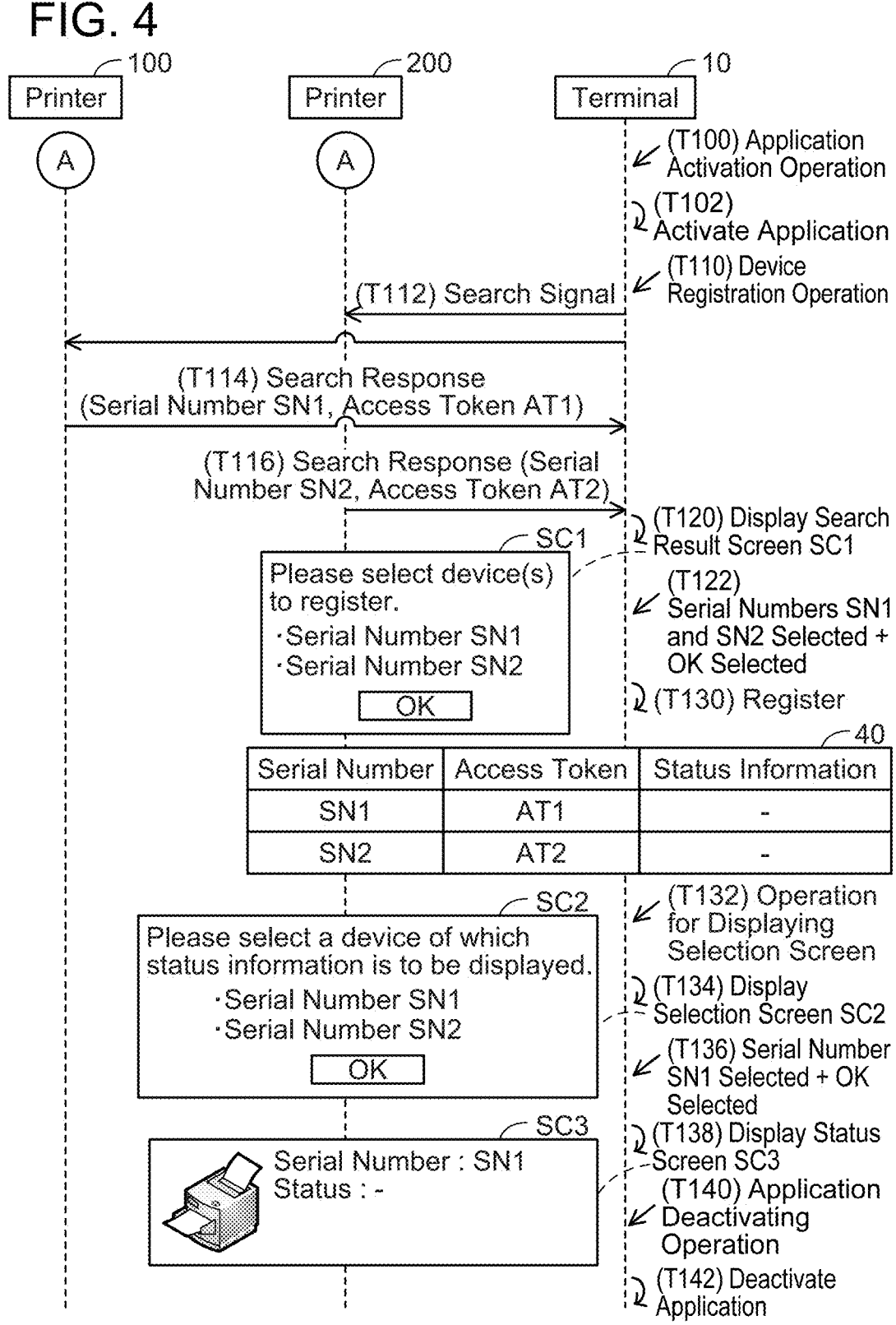
FIG. 4 shows a sequence diagram continued from FIG. 3.

(Continuation of FIG. 3; FIG. 4)

When the terminal 10 accepts an app activation operation from the user in T100 of FIG. 4, the terminal 10 activates the app 38 in T102.

When the terminal 10 accepts a device registration operation from the user in T110, the terminal 10 sends by broadcasting a search signal for searching for printers to the LAN 4 in T112.

When receiving the search signal from the terminal 10 in T112, the printer 100 sends a search response to the terminal 10 in T114. The search response includes the serial number SN1 of the printer 100 and the access token AT1 of the printer 100.

When receiving the search signal from the terminal 10 in T112, the printer 200 sends a search response to the terminal 10 in T116. The search signal includes the serial number SN2 of the printer 200 and the access token AT2 of the printer 200. The communication of T112 to T116 is not communication using the Internet 6 but communication using only the LAN 4.

When receiving the search responses from the printers 100 and 200 in T114 and T116, the terminal 10 causes the display unit 14 to display a search result screen SC1 in T120. The search result screen SC1 includes a message that prompts the selection of device(s) to be registered in the app 38, the received serial numbers SN1 and SN2, and an OK button.

The terminal 10 accepts the selection of both the serial numbers SN1 and SN2 from the user in T122, and after that it accepts the selection of the OK button. As a result, in T130, the terminal 10 stores the serial number SN1 in association with the access token AT1 in the device table 40 as well as the serial number SN2 in association with the access token AT2 in the device table 40.

When the terminal 10 accepts an operation for displaying a selection screen SC2 from the user in T132, the terminal 10 causes the display unit 14 to display the selection screen SC2 in T134. The selection screen SC2 is a screen for the selection of one serial number from among the plurality of registered serial numbers, and includes the registered serial numbers SN1 and SN2 and an OK button.

The terminal 10 accepts the selection of one serial number in the selection screen SC2 from the user in T136, and after that it accepts the selection of the OK button. In the present case, the serial number SN1 is selected. By designating a desired printer from among one or more printers stored in the app 38, the user can check the status information of that printer.

In T138, the terminal 10 causes the display unit 14 to display a status screen SC3. The status screen SC3 includes status information stored in the device table 40 in association with the serial number SN1. At this point, however, no status information is stored in association with the serial number SN1, and thus the displayed status screen SC3 includes only the serial number SN1.

After that, when the terminal 10 accepts an operation for deactivating the app 38 from the user in T140, the terminal 10 deactivates the app 38 in T142.

Figure 5:
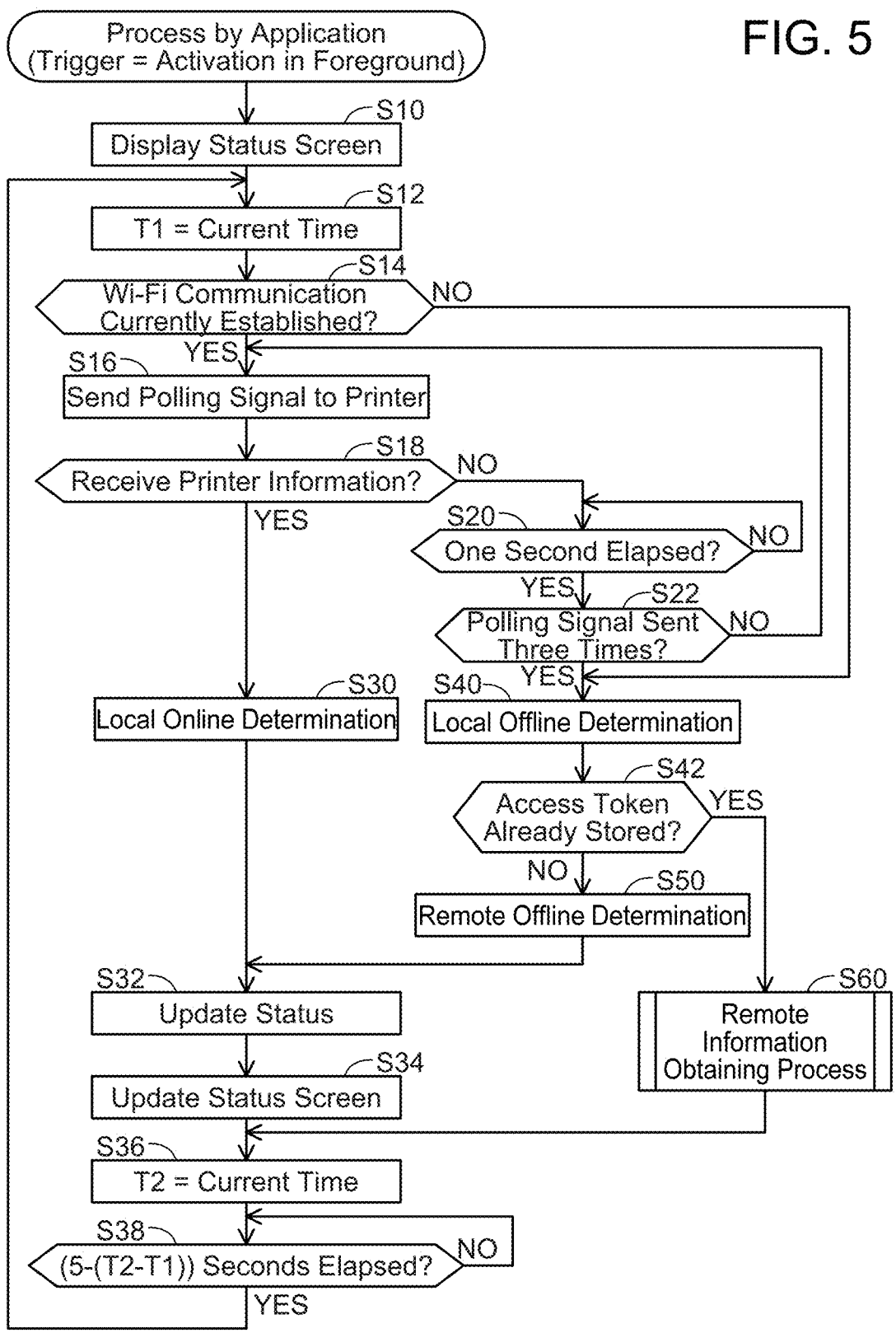
FIG. 5 shows a flowchart of a process executed by an application.

(Process by Application 38; FIG. 5)

Referring to FIG. 5, a process implemented by the CPU 32 of the terminal 10 executing the application 38 will be described. Hereinbelow, the process of FIG. 5 will be described with the app 38, not the CPU 32, as the subject of action. The process of FIG. 5 is started when the app 38 is activated in a foreground. The app 38 executes the process of FIG. 5 when activated in the foreground, while it does not execute the process of FIG. 5 when not activated or when activated in a background. A reason why the app 38 does not execute the process of FIG. 5 when activated in the background is because it cannot display information obtained through the process of FIG. 5. Since the app 38 does not execute the process of FIG. 5 when activated in the background, the processing load on the terminal 10 can be reduced.

In S10, the app 38 causes the display unit 14 to display a status screen. The status screen includes status information of one printer selected by the user (see the status screen SC3 in FIG. 4) from among one or more printers registered in the app 38 (T130 in FIG. 4). Hereinbelow, the one printer selected by the user will be termed "target printer". The status screen includes the serial number of the target printer (which will be termed "target serial number"), information indicative of a status of the target printer, and information indicative of a communication environment of the target printer.

In S12, the app 38 obtains the current time and stores the obtained current time as a time T1.

In S14, the app 38 determines whether the terminal 10 has established Wi-Fi communication via the Wi-Fi I/F 18 or not (Wi-Fi communication is present or not). Specifically, the app 38 inquires of the OS program 36 about whether Wi-Fi communication has been established or not. In a case where the app 38 obtains information indicating that the Wi-Fi communication has been established from the OS program 36, it determines that the Wi-Fi communication has been established (YES in S14) and proceeds to S16. On the other hand, in a case where the app 38 obtains information indicating that the Wi-Fi communication has not been established from the OS program 36, it determines that the Wi-Fi communication has not been established (NO in S14) and proceeds to S40.

In S16, the app 38 sends a polling signal to the target printer via the Wi-Fi I/F 18. The polling signal includes the target serial number. The app 38 stores the number of times a polling signal has been sent (which will be termed "polling signal number") and increments the polling signal number by one every time a polling signal is sent.

In S18, the app 38 determines whether information of the target printer is received via the Wi-Fi I/F 18 from the target printer. Hereinbelow, the information of the target printer will be termed "printer information". The printer information includes the target serial number and status information indicative of the current status of the target printer (e.g., normal, error, etc.). In a case where the app 38 receives the printer information from the target printer, it determines YES in S18 and proceeds to S30. In this case, the value of the polling signal number is reset (i.e., set to zero). On the other hand, in a case where the app 38 does not receive the printer information from the target printer, it determines NO in S18 and proceeds to S20.

In S20, the app 38 monitors whether one second has elapsed since the polling signal was sent in S16. In a case where one second has elapsed, the app 38 determines YES in S20 and proceeds to S22.

In S22, the app 38 determines whether the polling signal has been sent three times. Specifically, the app 38 determines whether the stored polling signal number (S16) is three or not. In a case where the polling signal number is three, the app 38 determines YES in S22 and proceeds to S40. In this case, the value of the polling signal number is reset (i.e., set to zero). On the other hand, in a case where the polling signal number is less than three, the app 38 determines NO in S22 and returns to S16.

In S30, the app 38 determines that a local connection is online. Here, a local connection means a connection via the Wi-Fi I/F 18 within the LAN 4 (i.e., a connection not via (not going through) the Internet 6). The local connection being online means that the app 38 is able to obtain the printer information from the target printer via the Wi-Fi I/F 18. When the process of S30 is completed, the app 38 proceeds to S32.

In S40, the app 38 determines that the local connection is offline. The local connection being offline means that the app 38 is not able to obtain the printer information from the target printer via the Wi-Fi I/F 18.

In S42, the app 38 determines whether an access token is already stored in association with the target serial number in the device table 40. In a case where an access token is already stored in association with the target serial number, the app 38 determines YES in S42 and proceeds to S60. On the other hand, in a case where an access token is not stored in association with the target serial number, the app 38 determines NO in S42 and proceeds to S50.

In S50, the app 38 determines that a remote connection is offline. A remote connection means a connection via the cellular I/F 16 (i.e., a connection via the Internet 6). The remote connection being offline means that the app 38 is unable to obtain the printer information from the server 300 via the cellular I/F 16. As will be described later in connection to FIG. 6, the app 38 attempts to obtain the printer information from the server 300 via the cellular I/F 16 in a case where it is unable to obtain the printer information from the target printer via the Wi-Fi I/F 18. In that attempt, the app 38 obtains the printer information from the server 300 by using the access token. That is, the app 38 cannot obtain the printer information from the server 300 unless an access token is stored in association with the target serial number. Thus, the app 38 determines that the remote connection is offline in S50. When the process of S50 is completed, the app 38 proceeds to S32.

In S60, the app 38 executes a remote information obtaining process. The remote information obtaining process is for obtaining the printer information from the server 300 via the cellular I/F 16. When S60 is completed, the app 38 proceeds to S36.

In S32, the app 38 updates (overwrites and stores) the status associated with the target serial number in the device table 40. In S32 following YES in S18, the status is updated by using the printer information received in S18 and the local online determination in S30. In S32 following NO in S18 (i.e., S32 executed after S50), the status is updated by using the local offline determination in S40 and the remote offline determination in S50.

In S34, the app 38 updates the status screen using the status updated in S32. Thus, the user can check the status information of the target printer by seeing the terminal 10.

In S36, the app 38 obtains the current time and stores the obtained current time as a time T2.

In S38, the app 38 monitors an elapse of (5−(time T2 (see S36)—time T1 (see S12)) seconds from the present. Specifically, the app 38 starts a timer and determines YES in S38 when the timer value becomes (5−(T2−T1)) seconds, and returns to S12. Here, (T2−T1) means the time required to execute a series of the processes S12 to S36 (including a series of processes via S50 and a series of processes via S60). Thus, the elapse of (5−(T2−T1)) seconds means an elapse of five seconds from the time T1 (i.e., S12). That is, while the app 38 is running in the foreground, the series of the processes S12 to S36 (including a series of processes via S50 and a series of processes via S60) is repeatedly executed every five seconds.

Figure 6:
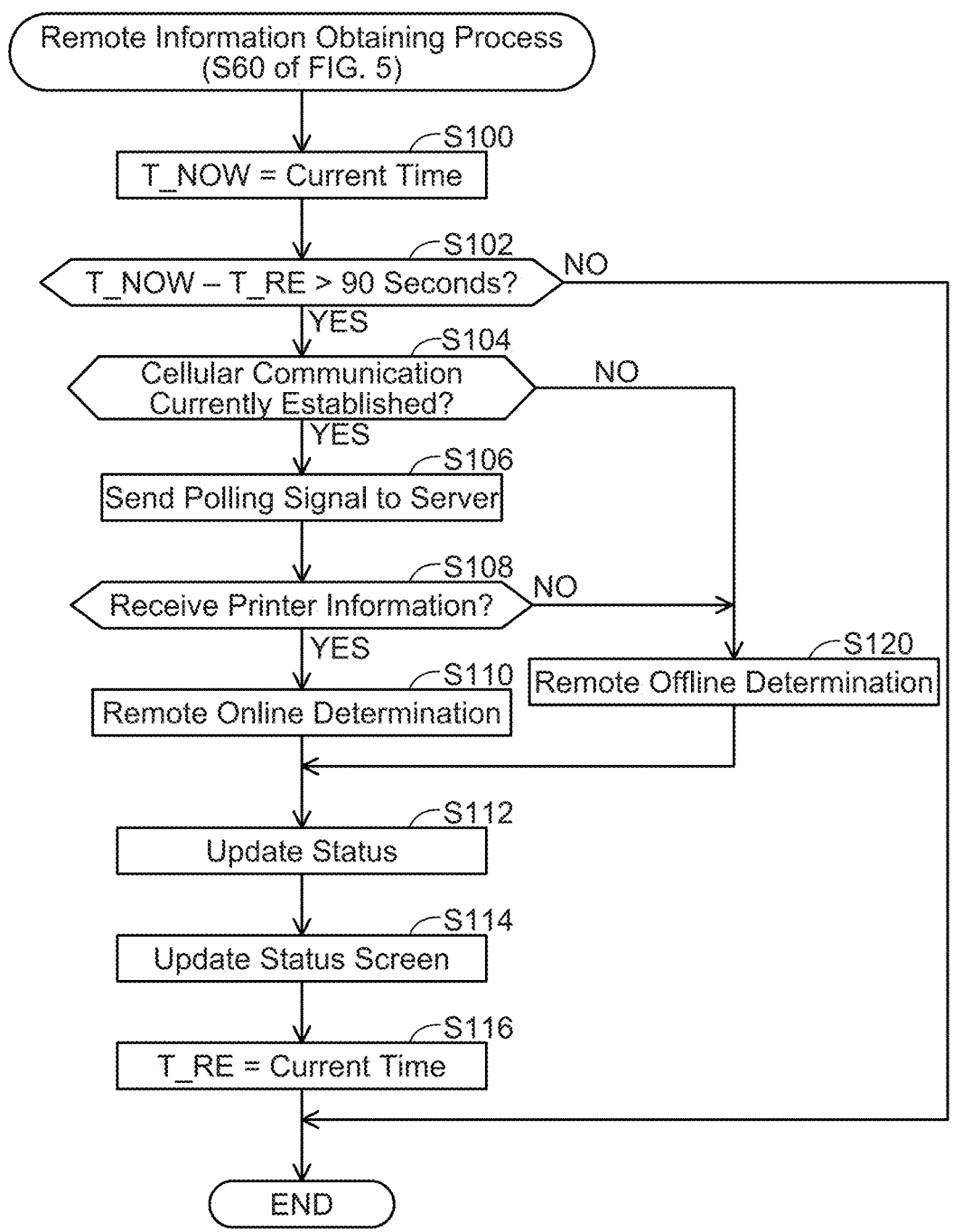
FIG. 6 shows a flowchart of a remote information obtaining process.

(Remote Information Obtaining Process; FIG. 6)

Referring to FIG. 6, the remote information obtaining process in S60 of FIG. 5 will be described. In S100, the app 38 obtains the current time and stores the obtained current time as a time T_NOW.

In S102, the app 38 determines whether (time T_NOW (see S100)−time T_RE (see S116 to be described later)) is greater than 90 seconds. The time T_RE is the time when a series of processes S102 to S120 was completed previously. In a case where (T_NOW−T_RE) is greater than 90 seconds, the app 38 determines YES in S102 and proceeds to S104. On the other hand, in a case where (T_NOW−T_RE) is equal to or less than 90 seconds, the app 38 determines NO in S102 and ends the process of FIG. 6 without executing processes from S104 and onward. In this way, the app 38 executes the series of processes S102 to S120 every 90 seconds. The app 38 does not send a polling signal (see S106) to the server 300 when 90 seconds has not elapsed yet since the series of processes was executed previously. This reduces the number of times the cellular communication is used relatively, and thus the communication cost can be held down. In the case where the T_RE has not been stored yet in S102 (i.e., the process of FIG. 6 has not been executed yet after the app 38 was activated in the foreground), the app 38 determines YES in S102.

In S104, the app 38 determines whether the terminal 10 has the cellular communication via the cellular I/F 16 established with a base station. Specifically, the app 38 inquires of the OS program 36 about whether the terminal 10 has the cellular communication established. In the case where the app 38 obtains information indicating that the cellular communication has been established from the OS program 36, it determines that the cellular communication has been established (YES in S104) and proceeds to S106. On the other hand, in the case where the app 38 obtains information indicating that the cellular communication has not been established from the OS program 36, it determines that the cellular communication has not been established (NO in S104) and proceeds to S120.

In S106, the app 38 sends a polling signal to the server 300 via the cellular I/F 16. The polling signal includes the target serial number and the access token stored in association with the target serial number.

In S108, the app 38 determines whether the printer information is received from the server 300. In a case where the printer information is received from the server 300, the app 38 determines YES in S108 and proceeds to S110. On the other hand, in a case where the printer information is not received from the server 300, the app 38 determines NO in S108 and proceeds to S120.

In S110, the app 38 determines that the remote connection is online. A remote connection being online means that the app 38 is able to obtain the printer information from the server 300 via the cellular I/F 16.

In S120, the app 38 determines that the remote connection is offline. When the process of S120 is completed, the app 38 proceeds to S112.

In S112, the app 38 updates (i.e., overwrites and stores) the status associated with the target serial number in the device table 40. In S122 following YES in S108, the app 38 updates the status using the printer information received in S108 and the remote online determination in S110. In S112 following NO in S108 (i.e., S112 executed after S120), the app 38 updates the status using the local offline determination in S40 of FIG. 5 and the remote offline determination in S120.

In S114, the app 38 updates the status screen using the status updated in S112.

In S116, the app 38 obtains the current time and stores the obtained current time as the time T_RE. When the process of S116 is completed, the app 38 ends the process of FIG. 6.

As described, the app 38 executes the series of processes for obtaining the printer information from the target printer via the Wi-Fi I/F 18 (S12 to S22 in FIG. 5) every five seconds and also executes the series of processes for obtaining the printer information from the server 300 via the cellular I/F 16 (S104 to S108) every 90 seconds. This reduces the number of times the cellular communication is used as compared to the number of times the Wi-Fi communication is used, and thus the communication cost can be held down.

In the series of processes for obtaining the printer information from the target printer via the Wi-Fi I/F 18, the app 38 sends a polling signal to the target printer every second up to three times (S20, S22). It can be contemplated that the app 38 may not obtain the printer information from the target printer by the first or second polling signal due to the communication being temporarily unstable. In such a situation, the app 38 sends a polling signal again to the target printer, by which it can obtain the printer information from the target printer appropriately.

Figure 7:
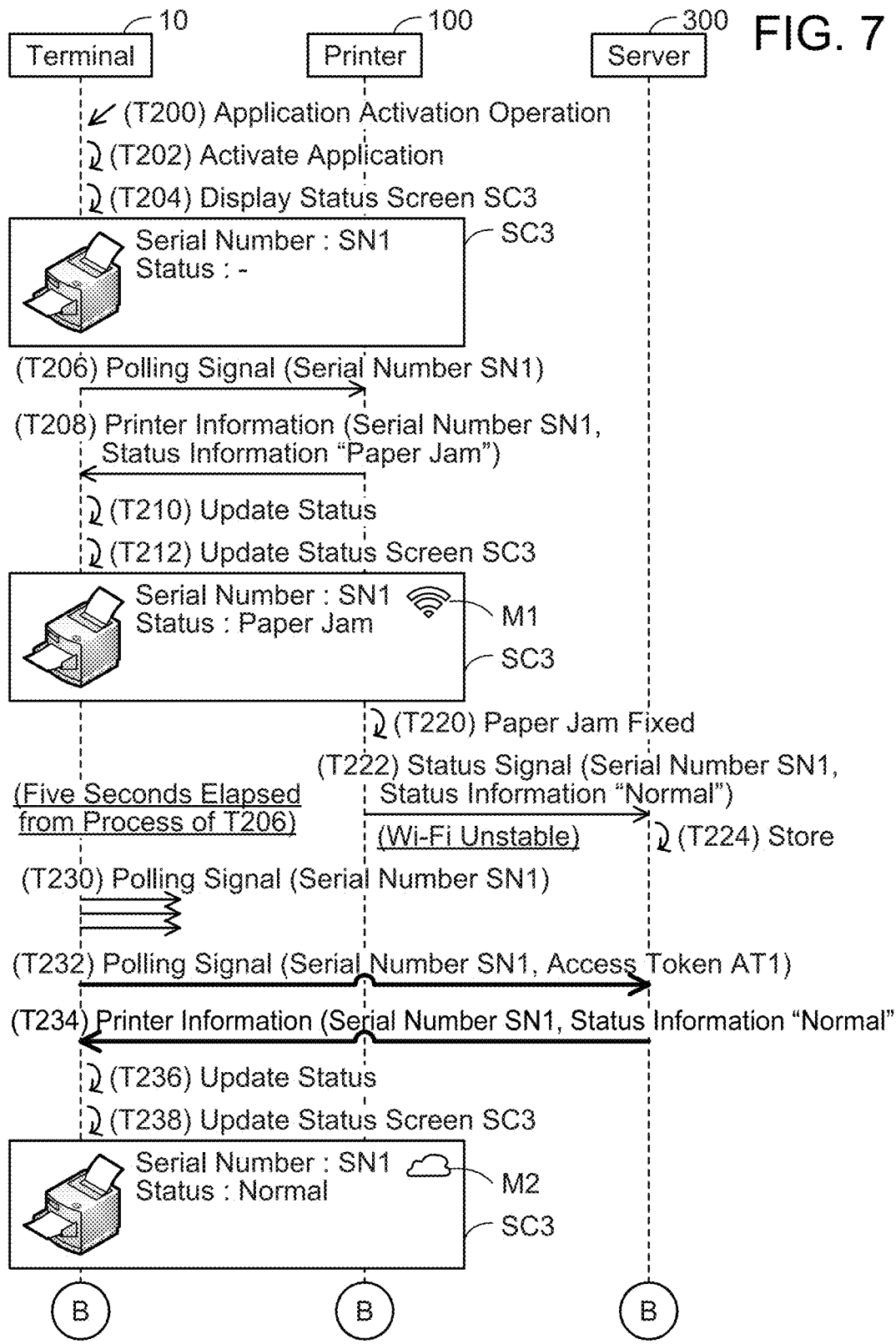
FIG. 7 shows a sequence diagram for the application to obtain status information.
Figure 8:
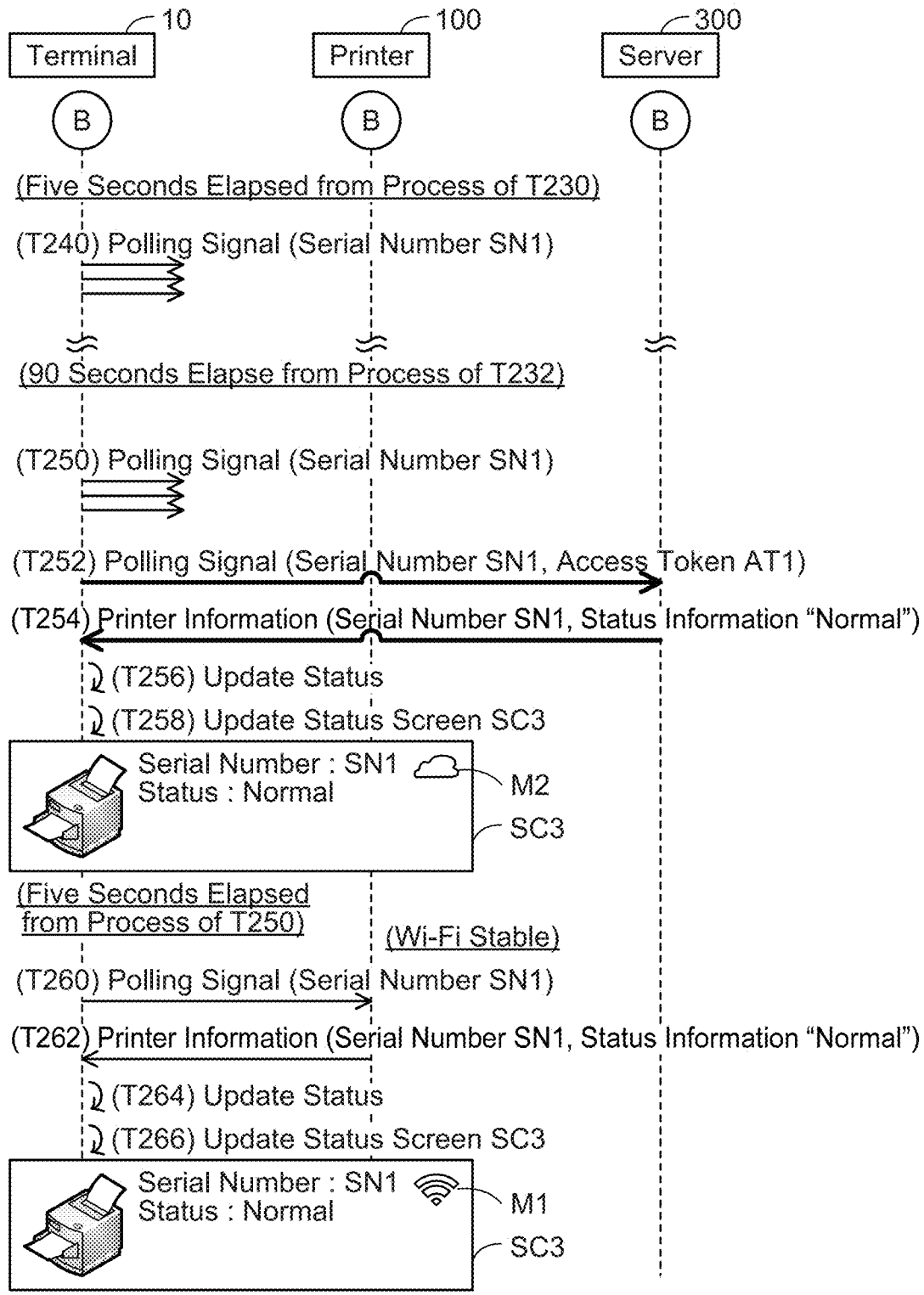
FIG. 8 shows a sequence diagram continued from FIG. 7.

(Specific Cases; FIGS. 7 and 8)

Specific cases realized by the processes of FIGS. 5 and 6 will be described. The initial state of FIG. 7 is the state where the serial numbers SN1 and SN2 are already registered in the app 38 (T130 in FIG. 4) and the serial number SN1 is already selected by the user (T136). That is, the process of FIG. 7 is a continuation of the process of FIG. 4. Further, in the initial state of FIG. 7, the terminal 10 has the Wi-Fi communication established. In FIG. 7, thin arrows mean communication of the terminal 10 via the Wi-Fi I/F 18 and bold arrows mean communication of the terminal 10 via the cellular I/F 16.

Processes of T200 and T202 are the same as the processes of T100 and T102 in FIG. 4, respectively. A process of T204 is the same as the process of T138 in FIG. 4. In T206, the terminal 10 sends a polling signal to the printer 100 via the Wi-Fi I/F 18 (S16) since the terminal 10 has the Wi-Fi communication established (YES in S14 of FIG. 5). The polling signal includes the serial number SN1 of the printer 100.

When receiving the polling signal from the terminal 10 in T206, the printer 100 sends the terminal 10 printer information including status information indicative of the current status of the printer 100 in T208. At the time of T208, a paper jam is occurring in the printer 100, and thus the status information indicates "paper jam".

When receiving the printer information from the printer 100 in T208 (YES in S18), the terminal 10 determines that the local connection is online (S30 in FIG. 5) and updates the status information stored in association with the serial number SN1 in the device table 40 in T210 (S32). Specifically, the terminal 10 stores the status information "paper jam" in association with the serial number SN1 in the device table 40.

In T212, the terminal 10 updates the status screen SC3 using the status information updated in T210 (S34). In particular, the updated status screen SC3 in T212 includes information indicating that the paper jam is occurring and a mark M1 indicating that the local connection is online. By seeing the status screen SC3, the user is able to know that the paper jam is occurring in the printer 100. Thus, the user can perform maintenance on the printer 100 to fix the paper jam. Further, the user is able to know that the local connection of the printer 100 is online (i.e., the terminal 10 has obtained the status information using the Wi-Fi communication).

Once the paper jam is fixed because of the maintenance by the user in T220, the printer 100 sends the server 300 a status signal including information indicating that the paper jam was fixed in T222.

When receiving the status signal from the printer 100 in T222, the server 300 stores the status information "normal" in association with the serial number SN1 included in the status signal in the management table 340 in T224.

After that, when five seconds has elapsed since the polling signal was sent in T206, the terminal 10 sends a polling signal again to the printer 100 via the Wi-Fi I/F 18 in T230 (S16). At this time, the printer 100 does not receive the polling signal from the terminal 10 due to the Wi-Fi communication being unstable at the printer 100. Specifically, when one second has elapsed without receiving the printer information from the printer 100 since the terminal 10 had sent the polling signal to the printer 100 (NO in S18, NO in S20, NO in S22), the terminal 10 sends a polling signal again to the printer 100 (S16). For the same reason, the terminal 10 does not receive the printer information from the printer 100 even though it had sent the second and third polling signals to the printer 100 (YES in S22).

The terminal 10 establishes the cellular communication with a base station since the access token AT1 is already stored in association with the serial number SN1 of the printer 100 in the device table 40 (YES in S42). In this case, the terminal 10 sends a polling signal to the server 300 via the cellular I/F 16 in T232 (S106) since it has not stored the time T_RE yet (YES in S102 of FIG. 6) and has already established the cellular communication with the base station (YES in S104). The polling signal includes the serial number SN1 of the printer 100 and the access token AT1 associated with the serial number SN1.

When receiving the polling signal from the terminal 10 in T232, the server 300 sends printer information including status information indicative of the current status of the printer 100 to the terminal 10 in T234. At the time of T234, the paper jam at the printer 100 was already fixed (T222), and thus the status information indicates "normal".

When receiving the printer information from the server 300 in T234, the terminal 10 determines that the remote connection is online (S110) and updates the status information stored in association with the serial number SN1 in the device table 40 in T236 (S112). Specifically, the terminal 10 stores the status information "normal" in association with the serial number SN1 in the device table 40.

In T238, the terminal 10 updates the status screen SC3 using the status information updated in T236 (S114). In particular, the updated status screen SC3 in T238 includes information indicating that the printer 100 is operating normally and a mark M2 indicating that the remote connection is online. By seeing the status screen SC3, the user is able to know that the paper jam was fixed at the printer 100. The user is further able to know that the remote connection of the printer 100 is online (i.e., the terminal 10 has obtained the status information using the cellular communication). (Continuation of FIG. 7; FIG. 8)

Thereafter, the terminal 10 stores the current time as the time T_RE (S116) and establishes the Wi-Fi communication. Although the terminal 10 establishes the Wi-Fi communication, it is unstable at the printer 100. When five seconds has elapsed since the first polling signal was sent in T230 of FIG. 7, the terminal 10 sends a polling signal to the printer 100 via the Wi-Fi I/F 18 in T240 of FIG. 8 (S16). The process of T240 is the same as the process of T230. In this case, the terminal 10 does not send a polling signal to the server 300 since (T_NOW−T_RE) is equal to or less than 90 seconds (NO in S102) and does not update the status information nor the status screen. As above, the app 38 does not send a polling signal again to the server 300 when 90 seconds has not elapsed since the polling signal was sent to the server 300. In this case, the app 38 cannot obtain the latest status information of the printer 100, however, it maintains the display of the status screen SC3 using the status information previously received from the server 300 without displaying information indicating that the latest status information cannot be obtained. In this way, the app 38 can continuously display the status screen SC3 using the previously obtained status information even when the latest status information cannot be obtained.

Thereafter, 90 seconds has elapsed since the polling signal was sent to the server 300 in T232. Here, the terminal 10 sends a polling signal to the printer 100 via the Wi-Fi I/F 18 in T250 (S16), however, this process of T250 is the same as each of the processes of T230 and T240.

In this case, the terminal 10 sends a polling signal to the server 300 via the cellular I/F 16 in T252 since (T_NOW−T_RE) is greater than 90 seconds (YES in S102). Processes of T252 to T258 are the same as the processes of T232 to T238 in FIG. 7.

Then, when five seconds has elapsed since the first polling signal was sent in T250, the terminal 10 sends a polling signal to the printer 100 via the Wi-Fi I/F 18 in T260 (S16).

Due to the Wi-Fi communication having become stable at the printer 100, the printer 100 receives the polling signal from the terminal 10 in T260 and then sends printer information including status information to the terminal 10 in T262. Processes of T260 to T266 are the same as the processes of T206 to T212 in FIG. 7.

Effects of Embodiment

According to the above configuration, the series of the processes of S106 and S108 in FIG. 6 using the cellular communication via the Internet 6 is executed every 90 seconds, while the series of the processes of S16 to S22 in FIG. 5 using the Wi-Fi communication not via the Internet 6 is executed every five seconds. That is, the interval for the series of the processes of S106 and S108 in FIG. 6 using the cellular communication is longer than the interval for the series of the processes of S16 to S22 in FIG. 5 using the Wi-Fi communication. This reduces the number of times the cellular communication via the Internet 6 is used, and thus the communication cost can be held down.

Especially in the present embodiment, the app 38 prioritizes the obtainment of status information by using the Wi-Fi communication not via the Internet 6 over the obtainment of status information by using the cellular communication via the Internet 6 (YES in S14 of FIG. 5, and the process of S60 is not executed in the case of YES in S18). This reduces the number of times the cellular communication via the Internet 6 is used, and thus the communication cost can be held down.

(Correspondence Relationships)

The terminal 10 and the printer 100 are examples of "terminal device" and "peripheral device", respectively. The server 300 is an examples of "server". The serial numbers are examples of "identification information". The cellular communication and the Wi-Fi communication are examples of "second communication" and "first type communication", respectively. The polling signal sent to the server 300 in S106 of FIG. 6 and the polling signal sent to the printer 100 in S16 of FIG. 5 are examples of "second polling signal" and "first polling signal", respectively. The series of the processes of S106 and S108 in FIG. 6 is an example of "second type communication process". The series of the processes of S16 to S22 in FIG. 5 is an example of "first type communication process". The status information is an example of "related information". Ninety seconds and five seconds are examples of "second polling interval" and "first polling interval", respectively. One second and "three" are examples of "predetermined time" and "predetermined number of times". The status screen SC3 is an example of "specific screen". The mark M2 which is displayed in the status screen SC3 in T238 of FIG. 7 and indicates that the remote connection is online is an example of "predetermined information".

The series of the processes of S106 and S108 in FIG. 6 is an example of "repeatedly execute a first-type communication process". The series of the processes of S16 to S22 in FIG. 5 is an example of "repeatedly execute a second-type communication process". The process of S34 in FIG. 5 and the process of S114 in FIG. 6 are examples of "cause a display unit of the terminal device to display a specific screen". The process of S14 in FIG. 5, the series of the processes of S18 to S22 in FIG. 5, and the process of S102 in FIG. 6 are examples of "determine whether the terminal device is capable of executing the second-type communication", "determine whether the related information is received from the second external device", and "determine whether the first interval has elapsed since the first-type communication process was executed previously", respectively. The process of T130 in FIG. 4 is an example of "store one or more pieces of identification information".

(First Variant) In the above embodiment, the terminal 10 executes the cellular communication with the server 300 via the Internet 6 using the cellular I/F 16, while it executes the Wi-Fi communication with the printer 100 not via the Internet 6 using the Wi-Fi I/F 18. However, the terminal 10 may not comprise the cellular I/F 16 and may comprise only the Wi-Fi I/F 18 as an I/F. In this variant, the terminal 10 may execute both the communication via the Internet 6 and the communication not via the Internet 6 by using the Wi-Fi I/F 18. In another variant, the terminal 10 may comprise a Bluetooth (registered trademark) I/F for executing Bluetooth communication according to a Bluetooth scheme, instead of the Wi-Fi I/F 18. In this variant, the Bluetooth communication is an example of the "second-type communication". Further, in another variant, the terminal 10 may comprise a LAN I/F for connecting to the LAN 4 instead of the Wi-Fi I/F 18. In this case, the LAN 4 may be a wireless LAN or a wired LAN. In this variant, the communication via the LAN 4 is an example of the "second-type communication".

(Second Variant) The status information included in the printer information the app 38 receives from the printer 100 or the server 300 is not limited to "normal" and "paper jam" in the embodiment, and it may be, for example, status information "low ink remaining amount" indicating that an amount of remaining ink is small. Further, information included in the printer information is not limited to the status information of the printer 100, and it may be any information related to the printer 100 such as subscription state of the printer 100 for a subscription service, security lock state of the printer 100, or the like. In this variant, the information related to the printer 100 is an example of the "related information".

(Third Variant) The interval for executing the processes of obtaining the status information of the printer 100 from the server 300 via the cellular I/F 16 is not limited to 90 seconds as in the embodiment, and it may be shorter or longer than 90 seconds. Further, the interval for executing the processes of obtaining the status information from the printer 100 via the Wi-Fi I/F 18 is not limited to five seconds as in the embodiment, and it may be shorter or longer than five seconds. It suffices that the interval for executing the processes of obtaining the status information of the printer 100 from the server 300 via the cellular I/F 16 is longer than the interval for executing the processes of obtaining the status information from the printer 100 via the Wi-Fi I/F 18.

(Fourth Variant) The app 38 may not update the status screen when receiving the printer information from the printer 100 or the server 300. In this variant, the process of S34 in FIG. 5 and the process of S114 in FIG. 6 can be omitted. In this variant, the status screen may be displayed, for example, when the user performs an operation for instructing the display of the status screen. Generally, "cause a display unit of the terminal device to display a specific screen" can be omitted.

(Fifth Variant) In the embodiment, the app 38 prioritizes the obtainment of status information by using the Wi-Fi communication not via the Internet 6 over the obtainment of status information by using the cellular communication via the Internet 6. In a variant, the app 38 may prioritize the obtainment of status information by using the cellular communication via the Internet 6 over the obtainment of status information by using the Wi-Fi communication not via the Internet 6. In this variant, "determine whether the terminal device is capable of executing the second-type communication" and "determine whether the related information is received from the second external device" can be omitted.

(Sixth Variant) In the embodiment, the app 38 sends a polling signal again to the printer 100 in the case where it does not receive the status information from the printer 100 even though one second has elapsed since the app 38 had sent a polling signal to the printer 100 (S20 in FIG. 5). Further, the app 38 sends a polling signal up to three times per the series of processes of obtaining the status information from the printer 100 (S22). The threshold number of seconds "one second" in the embodiment may be shorter or longer than one second. Further, the threshold number of times "three times" may be less or greater than three times. Generally, the "predetermined time" and the "predetermined number of times" are not limited to the aspects of the embodiment.

(Seventh Variant) In the case where the terminal 10 does not obtain the printer information from the printer 100 after having sent a polling signal to the printer 100 in T240 in FIG. 8, the terminal 10 may display a status screen indicating that the status information could not be received.

(Eighth Variant) The app 38 may execute the processes of FIGS. 5 and 6 while running in the background.

(Ninth Variant) In the embodiment, the app 38 executes the processes of FIGS. 5 and 6 to one printer selected by the user from among one or more printers registered in the device table 40 of the app 38. In a variant, the app 38 may execute the processes of FIGS. 5 and 6 to each of one or more printers registered in the device table 40 of the app 38 in parallel.

(Tenth Variant) In the case where the printer 100 is connected to the Internet 6, the app 38 may send a polling signal to the printer 100 by using the cellular communication via the Internet 6. In this variant, the printer 100 is an example of the "server" and "peripheral device".

(Eleventh Variant) In the embodiment, the processes of FIGS. 2 to 8 are implemented by software (e.g., the app 38), however, at least one of these processes may be implemented by hardware such as a logic circuit.

What is claimed is:

1. A non-transitory computer-readable recording medium storing an application program including computer-readable instructions for a mobile terminal device, the computer-readable instructions, when executed by a processor of the mobile terminal device, causing the mobile terminal device to:

in response to determining a first-type wireless communication is established, repeatedly execute, at a first polling interval which is predetermined, a first-type communication process using the first-type wireless communication not via Internet, wherein the first-type communication process is for receiving related information which is related to a printer, the first-type communication process includes sending a first polling signal to the printer, and the first polling interval being between a timing of sending the first polling signal and a timing of sending the next first polling signal; and in response to determining the first-type wireless communication is not established, and in response to determining a second-type wireless communication is established, repeatedly execute, at a second polling interval which is predetermined, a second-type communication process using the second-type wireless communication via the Internet, wherein the first polling interval is shorter than the second polling interval, wherein the second-type communication process is for receiving the related information related to the printer and includes sending a second polling signal to a server, and the second polling interval being between a timing of sending the second polling signal and a timing of sending the next second polling signal, wherein the predetermined first polling interval and the predetermined second polling interval are determined for and based on the first-type wireless communication and the second-type wireless communication, respectively, prior to the establishment of the first-type wireless communication and the establishment of the second-type wireless communication.

2. The non-transitory computer-readable recording medium as in claim 1, wherein the computer-readable instructions, when executed by the processor, further cause the mobile terminal device to:

cause a display unit of the mobile terminal device to display a specific screen indicating the related information in a case where the related information is received from the printer or the server.

3. The non-transitory computer-readable recording medium as in claim 1, wherein the computer-readable instructions, when executed by the processor, further cause the mobile terminal device to:

determine whether the mobile terminal device is capable of executing the first-type wireless communication, wherein in a case where it is determined that the mobile terminal device is not capable of executing the first-type wireless communication, the second-type communication process is executed, in a case where it is determined that the mobile terminal device is capable of executing the first-type wireless communication, the first-type communication process is executed, and in the case where it is determined that the mobile terminal device is capable of executing the first-type wireless communication, the second-type communication process is not executed.

4. The non-transitory computer-readable recording medium as in claim 3, wherein the computer-readable instructions, when executed by the processor, further cause the mobile terminal device to:

in the case where it is determined that the mobile terminal device is capable of executing the first-type wireless communication, determine whether the related information is received from the device, wherein in a case where it is determined that the related information is not received from the printer, the second-type communication process is executed.

5. The non-transitory computer-readable recording medium as in claim 4, wherein the first-type communication process includes sending the first polling signal to the printer again in a case where a predetermined time has elapsed without the related information being received from the printer since the first polling signal was sent to the printer, and in a case where the first polling signal is sent to the printer for a predetermined number of times and the related information is not received from the printer, it is determined that the related information is not received from the printer, the predetermined number of times being two or more.

6. The non-transitory computer-readable recording medium as in claim 4, wherein the computer-readable instructions, when executed by the processor, further cause the mobile terminal device to:

in the case where it is determined that the related information is not received from the printer, determine whether the second polling interval has elapsed since the second-type communication process was executed previously, wherein in a case where it is determined that the second polling interval has elapsed since the second-type communication process was executed previously, the second-type communication process is executed, in a case where it is determined that the second polling interval has not elapsed since the second-type communication process was executed previously, the second-type communication process is not executed, and in a case where it is determined that the second polling interval has not elapsed since the second-type communication process was executed previously and the first polling interval has elapsed since the first-type communication process was executed previously, the first-type communication process is executed.

7. The non-transitory computer-readable recording medium as in claim 6, wherein the computer-readable instructions, when executed by the processor, further cause the mobile terminal device to:

cause a display unit of the mobile terminal device to display a specific screen indicating the related information in a case where the related information is received from the printer or the server, wherein in a case where the related information is received from the server, the specific screen includes predetermined information indicating that the related information has been received by the second-type communication process, and in a case where the first-type communication process is executed and it is determined that the related information is not received from the printer in a state where the specific screen including the predetermined information is displayed at the display unit, the specific screen including the predetermined information is continuously displayed without replacing the predetermined information with information indicating that the first-type communication process failed.

8. The non-transitory computer-readable recording medium as in claim 1,
wherein in a case where the application program is running in a foreground, the first-type communication process is executed,
in the case where the application program is running in the foreground, the second-type communication process is executed, and
in a case where the application program is running in a background, neither of the first-type communication process nor the second-type communication process is executed.

9. The non-transitory computer-readable recording medium as in claim 1,
wherein the computer-readable instructions, when executed by the processor, further cause the mobile terminal device to: store one or more pieces of identification information for identifying one or more printers in a memory of the mobile terminal device,
wherein the printer is a device that is identified by one piece of identification information selected by a user from among the one or more pieces of identification information in the memory.

10. A method for controlling a mobile terminal device, the method comprising:
in response to determining a first-type wireless communication is established,
repeatedly executing, at a first polling interval which is predetermined, a first-type communication process using the first-type wireless communication not via Internet,
wherein the first-type communication process is for receiving related information which is related to a printer,
the first-type communication process includes sending a first polling signal to the printer, and
the first polling interval being between a timing of sending the first polling signal and a timing of sending the next first polling signal; and
in response to determining the first-type wireless communication is not established, and in response to determining a second-type wireless communication is established,
repeatedly executing, at a second polling interval which is predetermined, a second-type communication process using the second-type wireless communication via the Internet,
wherein the first polling interval is shorter than the second polling interval,
wherein the second-type communication process is for receiving the related information related to the printer and includes sending a second polling signal to a server, and
the second polling interval being between a timing of sending the second polling signal and a timing of sending the next second polling signal,
wherein the predetermined first polling interval and the predetermined second polling interval are determined for and based on the first-type wireless communication and the second-type wireless communication, respectively, prior to the establishment of the first-type wireless communication and the establishment of the second-type wireless communication.

11. The method as in claim 10, further comprising:
causing a display unit of the mobile terminal device to display a specific screen indicating the related information in a case where the related information is received from the printer or the server.

12. The method as in claim 10, further comprising:
determining whether the mobile terminal device is capable of executing the first-type wireless communication,
wherein in a case where it is determined that the mobile terminal device is not capable of executing the first-type wireless communication, the second-type communication process is executed,
in a case where it is determined that the mobile terminal device is capable of executing the first-type wireless communication, the first-type communication process is executed, and
in the case where it is determined that the mobile terminal device is capable of executing the first-type wireless communication, the second-type communication process is not executed.

13. The method as in claim 12, further comprising:
in the case where it is determined that the mobile terminal device is capable of executing the first-type wireless communication, determining whether the related information is received from the printer,
wherein in a case where it is determined that the related information is not received from the printer, the second-type communication process is executed.

14. The method as in claim 13,
wherein the first-type communication process includes sending the first polling signal to the printer again in a case where a predetermined time has elapsed without the related information being received from the printer since the first polling signal was sent to the printer, and
in a case where the first polling signal is sent to the printer for a predetermined number of times and the related information is not received from the printer, it is determined that the related information is not received from the printer, the predetermined number of times being two or more.

15. The method as in claim 13, further comprising:
in the case where it is determined that the related information is not received from the printer, determining whether the second polling interval has elapsed since the second-type communication process was executed previously,
wherein in a case where it is determined that the second polling interval has elapsed since the second-type communication process was executed previously, the second-type communication process is executed,
in a case where it is determined that the second polling interval has not elapsed since the second-type communication process was executed previously, the second-type communication process is not executed, and
in a case where it is determined that the second polling interval has not elapsed since the second-type communication process was executed previously and the first polling interval has elapsed since the first-type communication process was executed previously, the first-type communication process is executed.

16. The method as in claim 15, further comprising:
causing a display unit of the mobile terminal device to display a specific screen indicating the related information in a case where the related information is received from the printer or the server, wherein in a case where the related information is received from the server, the specific screen includes predetermined information indicating that the related information has been received by the second-type communication process, and in a case where the first-type communication process is executed and it is determined that the related information is not received from the printere in a state where the specific screen including the predetermined information is displayed at the display unit, the specific screen including the predetermined information is continuously displayed without replacing the predetermined information with information indicating that the first-type communication process failed.

17. The method as in claim 10, further comprising running an application program for controlling the mobile terminal device, wherein in a case where the application program is running in a foreground, the first-type communication process is executed, in the case where the application program is running in the foreground, the second-type communication process is executed, and in a case where the application program is running in a background, neither of the first-type communication process nor the second-type communication process is executed.

18. The method as in claim 10, further comprising:

storing one or more pieces of identification information for identifying one or more printers in a memory of the terminal device, wherein the printer is a device that is identified by one piece of identification information selected by a user from among the one or more pieces of identification information in the memory.

* * * * *